United States Patent
Ogushi (10) Patent No.: US 8,238,752 B2
(45) Date of Patent: Aug. 7, 2012

(54) PON (PASSIVE OPTICAL NETWORK) STATION SIDE APPARATUS, PON UPLINK LINE COMMUNICATION METHOD, AND PROGRAM RECORDING MEDIUM

(75) Inventor: Sadaichirou Ogushi, Tokyo (JP)

(73) Assignee: NEC Corporation, Tokyo (JP)

( * ) Notice: Subject to any disclaimer, the term of this patent is extended or adjusted under 35 U.S.C. 154(b) by 731 days.

(21) Appl. No.: 12/362,339

(22) Filed: Jan. 29, 2009

(65) Prior Publication Data

US 2009/0202249 A1    Aug. 13, 2009

(30) Foreign Application Priority Data

Feb. 7, 2008    (JP) ................................. 2008-027133

(51) Int. Cl.
*H04J 14/06* (2006.01)

(52) U.S. Cl. ................. 398/98; 398/34; 398/42; 398/43; 398/68; 398/202

(58) Field of Classification Search ..................... 398/34, 398/42–43, 68, 98
See application file for complete search history.

(56) References Cited

U.S. PATENT DOCUMENTS

2007/0092256 A1 *    4/2007    Nozue et al. .................... 398/72

FOREIGN PATENT DOCUMENTS

| JP | 2001523062 A | 11/2001 |
| JP | 2003-535501 A | 11/2003 |
| JP | 2005-045429 A | 2/2005 |
| JP | 2006174302 A | 6/2006 |
| JP | 2007243285 A | 9/2007 |

OTHER PUBLICATIONS

Japanese Office Action for JP2008-027133 Mailed on Mar. 21, 2012.

* cited by examiner

*Primary Examiner* — Dung Nguyen (57) ABSTRACT

A PON station side apparatus is provided with a selection section and a receiving section. For multiple data transferred from multiple PON terminal apparatuses that transmit data at different communication speeds in time division multiplexing, the selection section selects any of the multiple receiving circuits to be a receiving circuit for a receiving destination at which data is received on the basis of the transmission time zones for the data. The receiving section switches the receiving circuit selected by the selection section among the multiple receiving circuits to be the receiving circuit for the destination at which data is received of the data and receives the data through the switched receiving circuit.

7 Claims, 4 Drawing Sheets

| ONU Number | ONU Identification number (MACAddress) | Speed identification number |
|---|---|---|
| 1 | 00:00:00:00:00:01 | 1 |
| 2 | 00:00:00:00:00:02 | 0 |
| 3 | 00:00:00:00:00:03 | 1 |

ONU Setting management information registration table

Fig.4

| LLID Number | ONU Number |
|---|---|
| 1 | 3 |
| 2 | 1 |
| 3 | 2 |

LLID Allocation state table

Fig.5

| Band-allocation order | LLID Number | Uplink band allocation start time | Uplink band allocation time |
|---|---|---|---|
| 1 | 1 | 100000 | 1000 |
| 2 | 2 | 101000 | 2000 |
| 3 | 3 | 103000 | 1000 |

Band allocation state table

Fig.6

Status of band allocation and communication speed determination

PON (PASSIVE OPTICAL NETWORK) STATION SIDE APPARATUS, PON UPLINK LINE COMMUNICATION METHOD, AND PROGRAM RECORDING MEDIUM

This application is based upon and claims the benefit of priority from Japanese Patent Application No. 2008-027133 filed on Feb. 7, 2008, the content of which is incorporated by reference.

BACKGROUND OF THE INVENTION

1. Field of the Invention

The present invention relates to a PON station side apparatus, a PON uplink line communication method, a PON uplink line communication program, and a program recording medium, and in particular to a PON station side apparatus that enables different communication speeds to coexist in a PON uplink line, a PON uplink line communication method, and a program recording medium.

2. Description of the Related Art

A PON system connects an aggregation station and multiple terminal apparatuses of subscribers' homes by an optical fiber network in which one optical fiber branches to multiple optical fibers via an optical coupler, and this PON system attracts much attention as the core technology of FTTH (Fiber to the Home) technology.

However, the technique described above has problems as shown below.

In an EPON (Ethernet passive optical network), which is a PON system based on the Ethernet (R) technique, the communication method is specified in accordance with the IEEE802.3 standard. At first, the Ethernet communication speed that is to be the base of this communication standard was 1 Gbps, which is the communication speed of the Gigabit Ethernet. However, use of a new communication speed, such as 10 Gigabit Ethernet, has started, and there is a possibility that both speeds may coexist in an uplink line.

When multiple kinds of communication speeds are allowed to coexist in the uplink line, an aggregation station side terminating apparatus, that is, a PON station side apparatus OLT (optical line terminal) requires a receiving function that is compatible with the multiple kinds of communication speeds. In JP-2007-243285-A, a technique is proposed in which a PON system specifies the transmission start time and the transmission speed for transmitted data in an uplink line, from a PON station side apparatus OLT to a terminal side terminating apparatus, that is, a PON terminal apparatus ONU (optical network unit), and sets the receiving circuit of the PON station side apparatus OLT to perform a receiving operation suitable for data at the specified transmission speed.

However, in the technique described in JP-2007-243285-A, when data are transmitted in a state in which communication speeds coexist by wavelength division multiplexing or time division multiplexing, from multiple terminal apparatus side terminating apparatuses, that is, PON terminal apparatuses ONUs (optical network units), there may be a case in which it is not possible to sufficiently cope with the transmission. That is, though it is generally assumed that wavelength division multiplexing or time division multiplexing is adopted in a case in which different communication speeds are allowed to coexist in an uplink line, there is a possibility that, in such a case, the PON station side apparatus OLT cannot perform a normal data receiving function.

For example, in the case of realizing a data receiving operation in a PON station side apparatus OLT while allowing different communication speeds to coexist in an uplink line by using time division multiplexing, it is assumed to adopt a technique of applying bandwidth allocation by using a DBA (dynamic bandwidth allocation), module which is a time division multiplexing technique for a PON system, as described in JP-2007-243285-A. However, in the case of the configuration like that of JP-2007-243285-A, since the OLT receives data that have different communication speeds and according to different communication methods when in a time-division multiplexed state in which use of the bandwidth allocation occurs through use of a DBA module, whether effective or ineffective data has been received cannot be determined. Therefore, there is a possibility that, for example, the OLT erroneously reconfigures such data as has been received at a wrong timing as effective data.

SUMMARY OF THE INVENTION

An exemplary object of the present invention is to provide, in a PON network in which different communication speeds are allowed to coexist in an uplink line, a PON station side apparatus OLT which is provided with receiving circuits according to communication speeds and which is mounted with receiving circuit switching means interlocked with a DBA module, that is, a speed selector and which switches to a receiving circuit that corresponds to a communication speed for receiving data in order to receive the data, a PON uplink line communication method, and a program recording medium.

In order to achieve the above object, an exemplary aspect of the invention is a PON station side apparatus comprising: a switching section which, when receiving data transferred from multiple PON terminal apparatuses with different communication speeds in time division multiplexing, switches the receiving destination of each of the data to any of the multiple receiving circuits among the multiple receiving circuits on the basis of transmission time zones for the data; and a receiving section which receives the data through the receiving circuit switched by the switching means.

A PON uplink line communication method of the present invention is a method in which, when data transferred are received from multiple PON terminal apparatuses with different communication speeds in time division multiplexing, the receiving destination of each of the data is switched to any of multiple receiving circuits provided for a PON station side apparatus, and the data is received through the switched receiving circuit.

A recording medium of the present invention is a recording medium in which a program is recorded, the program causing a computer to function as a switching procedure in which, when data transferred from multiple PON terminal apparatuses with different communication speeds in time division multiplexing are received, the receiving destination of each of the data is switched to any receiving circuit among multiple receiving circuits provided for a PON station side apparatus, and a receiving procedure in which the data is received through the receiving circuit switched by the switching procedure.

The above and other objects, features, and advantages of the present invention will become apparent from the following description with references to the accompanying drawings which illustrate examples of the present invention.

DETAILED DESCRIPTION OF THE PREFERRED EMBODIMENTS

An exemplary embodiment of a PON station side apparatus, a PON uplink line communication method, a PON uplink line communication program and a program recording medium will be described below with reference to accompanying drawings. In the description below, the PON station side apparatus and the PON uplink line communication method according to the present invention will be described. However, it goes without saying that the PON uplink line communication method may be implemented as a PON uplink line communication program which can be executed by a computer, or the PON uplink line communication program may be recorded in a recording medium which can be read by the computer.

Characteristics of the Present Invention

Prior to a description of the exemplary embodiment, a summary of the characteristics of the present invention will be made first. The present invention realizes a mechanism for controlling an uplink line communication method in a PON (passive optical network) system. According to the present invention, in a PON station side apparatus OLT (optical line terminals aggregation station side terminating apparatus) constituting a PON (passive optical network) system in which PON terminal apparatuses ONUs (optical network units) that transmit data at different communication speeds coexist, there are provided receiving circuits that receive data from each PON terminal apparatus ONU for each communication speed so as to correspond to the different communication speeds. Furthermore, the present invention is characterized in that, by mounting receiving circuit switching means interlocked with a DBA (dynamic bandwidth allocation) module, that is, a speed selector on the OLT, a receiving circuit corresponding to the communication speed of a transmission-permitted PON terminal apparatus ONU is appropriately selected, and thereby, the PON system is enabled to perform normal communication.

That is, according to the present invention, in an EPON system under an environment where terminal apparatus side terminating apparatuses, that is, PON terminal apparatuses ONUs with different communication speeds coexist, when the uplink line is controlled being multiplexed by time division multiplexing so as to receive data with different communication speeds, a PON station side apparatus OLT is provided with multiple modules corresponding to the communication speeds, at least for each of the modules of a physical medium dependent section PMD (physical medium dependent), a physical medium connection attachment section PMA (physical medium attachment), a physical coding sublayer PCS (physical coding sublayer) and a frame buffer as receiving circuits provided according to communication speeds in order to realize a normal data transfer operation. The present invention is mainly characterized in that the normality of data transfer is secured by appropriately selecting each module that corresponds to the communication speed of the PON terminal apparatus which t\has reached the timing at which transmissions occur in the transmission time zone and to which a bandwidth has been allocated, from among the modules of the physical medium dependent section PMD, the physical medium attachment section PMA, the physical coding sublayer PCS and the frame buffer, in interlock with a DBA module.

Furthermore, the present invention is mainly characterized in being provided with IDLE pattern setting means for setting an IDLE pattern that indicates that there is no data for each of the modules that correspond to the communication speeds of such PON terminal apparatuses that have not the timing at which transmissions occur in the transmission time zone.

Configuration of an Exemplary Embodiment

Figure 1:
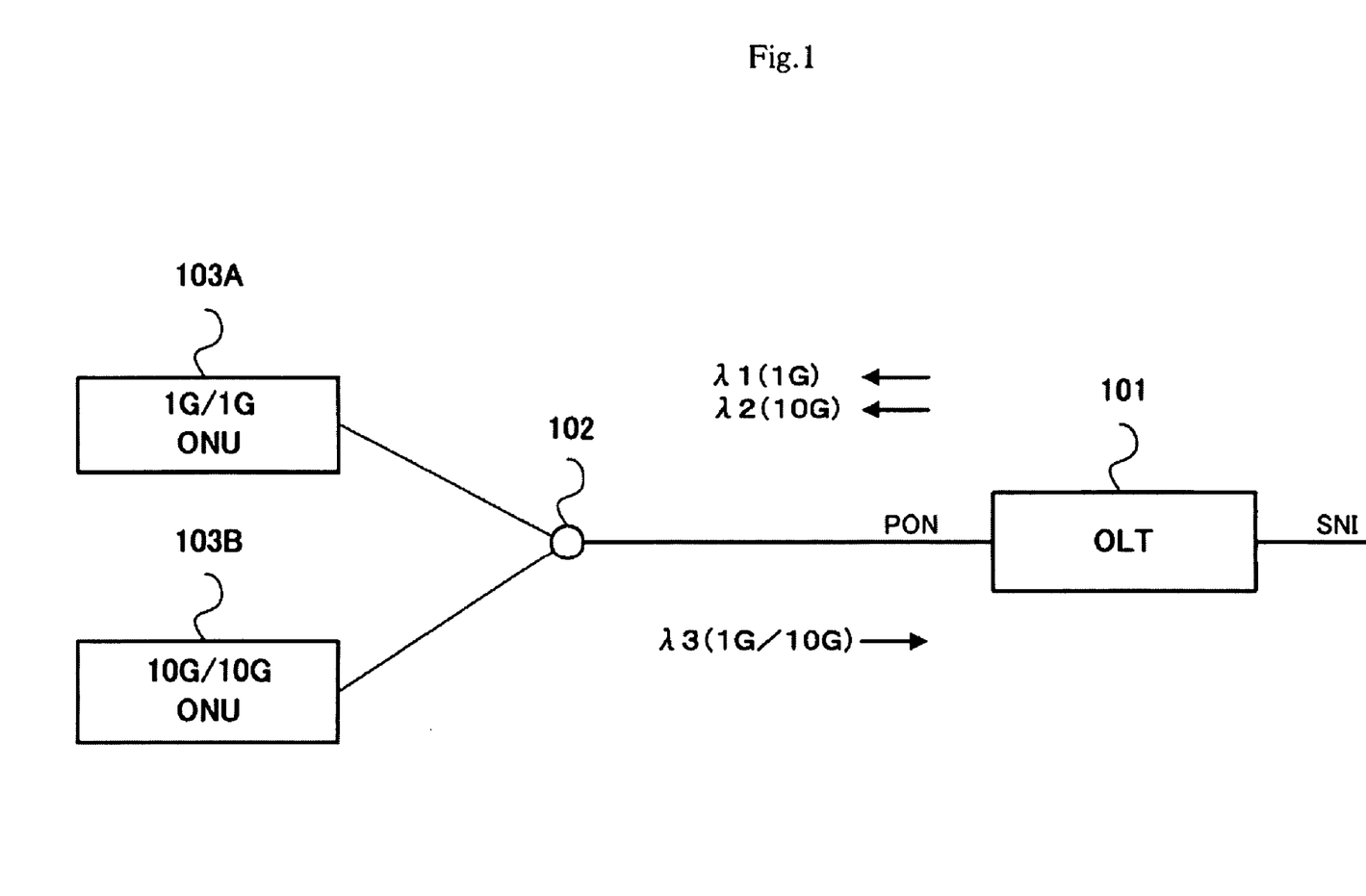
FIG. 1 is a network configuration diagram showing an example of the network configuration of a PON system constituting a PON station side apparatus OLT according to the present invention.

Next, the configuration of an exemplary embodiment will be described, and first, a configuration example of an optical access network system, that is, a PON system will be described with reference to FIG. 1. FIG. 1 is a network configuration diagram showing an example of the network configuration of a PON system constituting a PON station side apparatus OLT according to the present invention. Specifically, this diagram shows a system configuration similar to that of a general optical access network system as an EPON (Ethernet passive optical network) system.

In the network configuration diagram in FIG. 1, reference numeral 101 denotes an aggregation station side terminating apparatus in the EPON system, that is, a PON station side apparatus OLT (optical line terminal). PON station side apparatus OLT 101 is provided with both of a UNI (user network interface) which is a user side network interface and an SNI (service node interface) which is a business side network interface. Reference numeral 102 denotes an optical coupler for branching the light of a downlink line. Both of reference numerals 103A and 103B arranged at the end of the downlink line denote a terminal apparatus side terminating apparatus in the EPON system, that is, a PON terminal apparatus ONU (optical network unit).

Here, in the network configuration shown in FIG. 1, PON terminal apparatus ONU 103A and PON terminal apparatus ONU 103B are different in the communication speed. This diagram shows a case where the uplink line from optical coupler 102 to PON station side apparatus OLT 101 is under an environment in which communications in conformity with different speed standards coexist, and the uplink line is time-division multiplexed.

For example, in FIG. 1, the communication speed of one PON terminal apparatus ONU 103A is 1 Gbps, and the communication speed of the other PON terminal apparatus ONU 103B is 10 Gbps, unlike PON terminal apparatus ONU 103A. As for the downlink line from PON station side apparatus OLT 101, a wavelength λ1 for 1 Gbps and a wavelength λ2 for 10 Gbps are multiplexed to be multiplex-transmitted. On the other hand, as for the uplink line, both 1 Gbps from PON terminal apparatus ONU 103A and 10 Gbps from PON terminal apparatus ONU 103B are transmitted as wavelength λ3 from optical coupler 102 to PON station side apparatus OLT 101. However, PON terminal apparatus ONU 103A and PON terminal apparatus ONU 103B are configured so that their data are transmitted during different transmission time zones to avoid conflict between the data.

That is, PON terminal apparatus ONU 103A and PON terminal apparatus ONU 103B perform communication with PON station side apparatus OLT 101 in conformity with the multipoint control protocol MPCP (multipoint control protocol) specified by the IEEE802.3 standard, and receive a transmission permission signal from PON station side apparatus OLT 101. According to this communication method, a data transmission operation by time division multiplexing is realized in which data is transmitted during a transmission time zone (data transmission start time and data transmission time) notified by the transmission permission signal.

Figure 2:
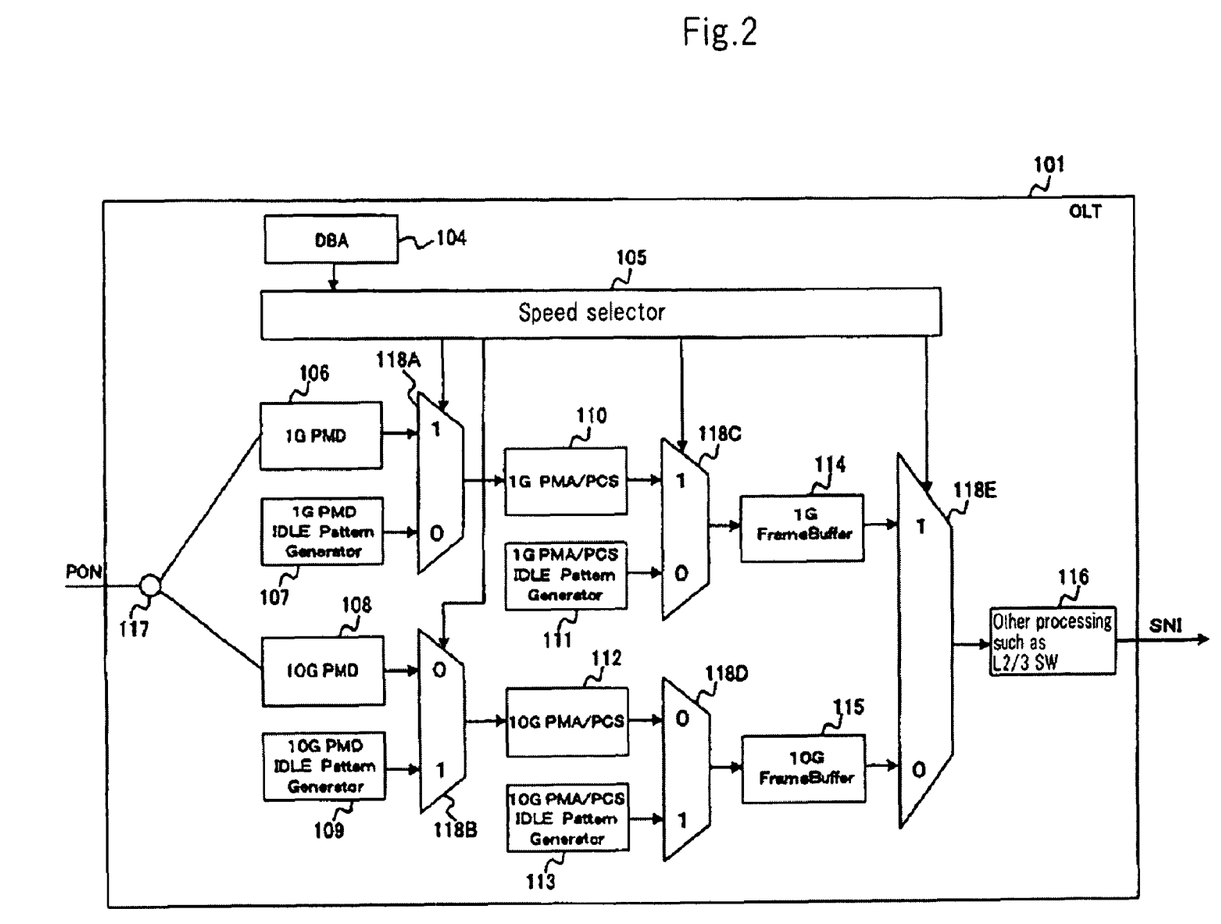
FIG. 2 is a block diagram showing an example of a section corresponding to an uplink line in the internal configuration of the PON station side apparatus OLT according to the present invention.

FIG. 2 is a block diagram showing an example of a section corresponding to an uplink line, in the internal configuration of PON station side apparatus OLT 101 according to the present invention, and it shows a configuration example of an uplink direction communication path in PON station side apparatus OLT 101. That is, FIG. 2 shows an example of a module constituting an uplink communication path in PON station side apparatus OLT 101.

For example, PON station side apparatus OLT 101 is configured by the DBA (dynamic bandwidth allocation) module, the speed selector, and various modules to process main signals (data received from the PON terminal apparatus ONUs) that is, the physical medium dependent section PMD (physical medium dependent), the physical medium attachment section PMA (physical medium attachment), the physical coding sublayer PCS (physical coding sublayer), the frame buffer, a layer 2/3 switch L2/3 SW and others.

Here, as for each of the modules of the physical medium dependent section PMD, the physical medium attachment section PMA, the physical coding sublayer PCS and the frame buffer, multiple modules are arranged depending on the difference among communication speeds in the uplink line. According to the speed selector interlocked with the DBA module for dynamically allocating bandwidths (communication time zones) to the PON terminal apparatuses ONUs, a module corresponding to the communication speed of an allocated PON terminal apparatus ONU is appropriately selected from among the arranged multiple modules and switching thereto is performed, and thereby, a data transfer operation accurately responding to differences in the communication speed is realized.

In the block diagram in FIG. 2, reference numeral 104 denotes a DBA module for dynamically allocating bandwidths (communication time zones) to PON terminal apparatuses ONUs. By transmitting a transmission permission signal indicating an allocated bandwidth (transmission time zone) to PON terminal apparatus ONU 103A and PON terminal apparatus ONU 103B using DBA module 104, PON station side apparatus OLT 101 controls the timing to permit data transmission. The transmission permission signal is notified to PON terminal apparatus ONU 103A and PON terminal apparatus ONU 103B by using a procedure that conforms with Multipoint Control Protocol MPCP.

Reference numeral 105 denotes a speed selector for selecting either 1 Gbps or 10 Gbps for uplink line communication, that is, for uplink direction communication. Speed selector 105 is controlled by DBA module 104 and selects an uplink line communication speed, that is, an uplink direction communication speed. Reference numeral 106 denotes a 1 G physical medium dependent section for receiving light at the communication speed of 1 Gbps, that is, a 1 G PMD module. Reference numeral 107 denotes a 1 G physical medium dependent section, that is, a 1 G PMD IDLE PG (pattern generator) module. When 1 G PMD module 106 is not at the timing to receive data from a PON terminal apparatus ONU, this 1 G PMD IDLE PG module 107 outputs an IDLE signal indicating that instead of having receiving data from PON terminal apparatus ONU, no data has been received. Thus, 1 G PMD IDLE PG module 107 constitutes IDLE pattern setting means for 1 Gbps.

Reference numeral 108 denotes a 10 G physical medium dependent section for receiving light at the communication speed of 10 Gbps, that is, a 10 G PMD module. Reference numeral 109 denotes a 10 G physical medium dependent section, that is, a 10 G PMD IDLE PG (pattern generator) module. When 10 G PMD module 108 is not at the timing to receive data from a PON terminal apparatus ONU, 10 G PMD IDLE PG module 109 outputs an IDLE signal indicating that instead of having receiving data from PON terminal apparatus ONU, no data has been received. Thus, 10 G PMD IDLE PG module 109 constitutes IDLE pattern setting means for 10 Gbps.

Reference numeral 110 denotes a 1 G PMA/PCS module configured by a 1 G physical medium attachment section 1 G PMA and a 1 G physical coding sublayer 1 G PCS for converting data at a communication speed of 1 Gbps which have been received from a communication medium to an Ethernet frame format. Reference numeral 111 denotes a 1 G PMA/PCS IDLE PG (pattern generator) module. When 1 G PMA/PCS module 110 is not at the timing to receive data, this 1 G PMA/PCS IDLE PG module outputs an IDLE signal indicating that instead of having receiving data from PON terminal apparatus ONU, no data has been received. Thus, 1 G PMA/PCS IDLE PG module 111 constitutes IDLE pattern setting means for 1 Gbps conversion processing.

Reference numeral 112 denotes a 10 G PMA/PCS module configured by a 10 G physical medium attachment section 10 G PMA and a 10 G physical coding sublayer 10 G PCS for converting data at a communication speed of 10 Gbps which have been received from a communication medium to an Ethernet frame format. Reference numeral 113 denotes a 10 G PMA/PCS IDLE PG (pattern generator) module. When 10 G PMA/PCS module 112 is not at the timing to receive data, this 10 G PMA/PCS IDLE PG module 113 outputs an IDLE signal indicating that instead of having receiving data from PON terminal apparatus ONU, no data has been received. Thus, 10 G PMA/PCS IDLE PG module 113 constitutes IDLE pattern setting means for 10 Gbps conversion processing.

Reference numeral 114 denotes a 1 G frame buffer module for buffering data received from 1 G PMA/PCS module 110 as an Ethernet frame. Reference numeral 115 denotes a 10 G frame buffer module for buffering data received from 10 G PMA/PCS module 112 as an Ethernet frame.

Reference numeral 116 denotes a general function module for performing general functions as other OLT functions such as a layer 2/3 function and bandwidth control provided for PON station side apparatus OLT 101. Reference numeral 117 denotes an optical coupler for branching light in the uplink line, that is, in the uplink direction and inputting the lights into 1 G PMD module 106 and 10 G PMD module 108. All of reference numerals 118A to 118E denote a selector. These selectors are controlled by speed selector 105, and they select a signal to be allowed to pass depending on whether the value is "0" or "1".

Figure 3:
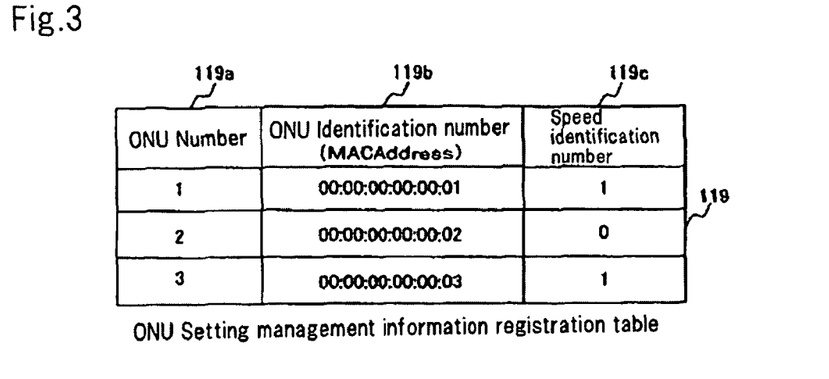
FIG. 3 is a table configuration diagram showing an example of an ONU setting management information registration table, in which setting management information about connected PON terminal apparatuses ONUs is stored, in the internal configuration of the PON station side apparatus OLT according to the present invention.

As shown in FIG. 3, setting management information about PON terminal apparatuses ONUs 103A and 103B connected to the EPON system is stored in PON station side apparatus OLT 101, though it is not shown in FIG. 2. FIG. 3 is a table configuration diagram showing an example of an ONU setting management information registration table, in which the setting management information about connected PON terminal apparatuses ONUs 103A and 103B is stored in the internal configuration of PON station side apparatus OLT 101 according to the present invention.

As shown in FIG. 3, ONU setting management information registration table 119 is a table for uniquely identifying each of connected PON terminal apparatuses ONUs 103A and 103B by a MAC address or the like and for managing the communication speed compatibility of PON terminal apparatuses ONUs 103A and 103B. ONU setting management information is registered with this table. The information includes at least PON terminal apparatus ONU number 119*a*, PON terminal apparatus ONU identification number 119*b* configured by a MAC address or the like, and speed identification number 119*c*. ONU setting management information registration table 119 is set in advance in a predetermined part (for example, speed selector 105) in PON station side apparatus OLT 101. In the example shown in FIG. 3, when the value of speed identification number 119*c* is "1", the communication speed of each of the corresponding PON terminal apparatuses ONUs whose ONU numbers 119*a* are "1" and "3" is 1 Gbps. On the other hand, when the value of speed identification number 119*c* is "0", the communication speed of the corresponding PON terminal apparatus ONU whose ONU number 119*a* is "2" is 10 Gbps.

In the example of the exemplary embodiment shown in FIGS. 2 and 3, a downlink line communication path, that is, a downlink direction communication path from PON station side apparatus OLT 101 to PON terminal apparatuses ONUs 103A and 103B is not shown. The communication path is omitted because it is not directly related to the present invention. As for general function module 116 for realizing other general functions, such as the layer 2/3 function L2/3 SW and also bandwidth control, the detailed configuration thereof is omitted here because it is a part which is not directly related to the present invention and it is a generally well-known function.

Description of the Operation of the Exemplary Embodiment

Next, an example of the operation of PON station side apparatus OLT 101 shown in FIGS. 1 to 3 will be described. PON station side apparatus OLT 101, PON terminal apparatus ONU 103A and PON terminal apparatus ONU 103B are controlled to conform with the multipoint control protocol MPCP as described before. When PON terminal apparatus ONU 103A or PON terminal apparatus ONU 103B is connected to the EPON system as shown in FIG. 1, exchange of control information in conformity with the multipoint control protocol MPCP is performed with PON station side apparatus OLT 101, and a logical number referred to as a logical link identification number LLID (logical link ID) is allocated.

Figure 4:
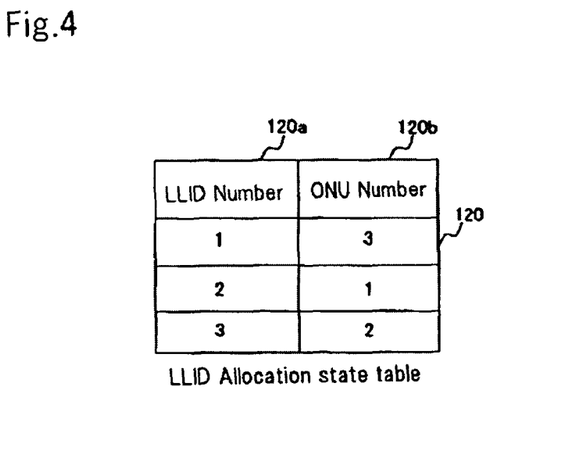
FIG. 4 is a table configuration diagram showing an example of an LLID allocation state table which is arranged in the PON station side apparatus OLT according to the present invention and in which allocated logical identification numbers LLIDs are registered.

As a result, PON station side apparatus OLT 101 registers the allocated logical link identification number LLID with LLID allocation state table 120 as shown in FIG. 4. After that, control is performed on the basis of the allocated logical link identification number LLID between PON station side apparatus OLT 101 and PON terminal apparatus ONU 103A or PON terminal apparatus ONU 103B. FIG. 4 is a table configuration diagram showing an example of LLID allocation state table 120 which is arranged in PON station side apparatus OLT 101 according to the present invention and in which the allocated logical identification number LLID is registered.

As shown in FIG. 4, LLID allocation state table 120 is configured to include at least allocated logical link identification numbers LLIDs 120*a*, and PON terminal apparatus ONU numbers 120*b* which are the same as the numbers registered as PON terminal apparatus ONU numbers 119*a* in ONU setting management information registration table 119 shown in FIG. 3, as numbers which uniquely identify the connected PON terminal apparatus ONU 103A and PON terminal apparatus ONU 103B. In the example of LLID allocation state table 120 shown in FIG. 4, a logical link identification number LLID "1" is allocated to a PON terminal apparatus ONU whose PON terminal apparatus ONU number 119*a* is "3" in ONU setting management information registration table 119 shown in FIG. 3. In the same table, a logical link identification number LLID "2" is allocated to a PON terminal apparatus ONU whose PON terminal apparatus ONU number 119*a* is "1".

Figure 5:
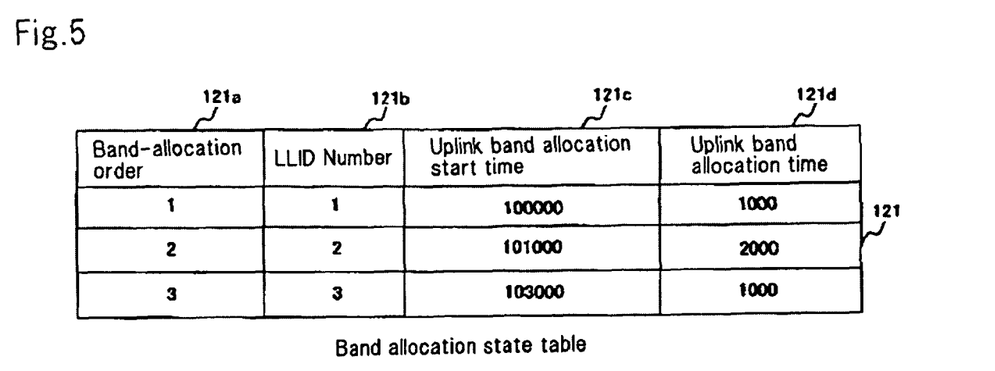
FIG. 5 is a table configuration diagram showing an example of a bandwidth allocation state table which is arranged in the PON station side apparatus OLT according to the present invention and in which transmission-permitted data transmission start time and data transmission time are registered for each PON terminal apparatus ONU.

As shown in FIG. 2, PON station side apparatus OLT 101 gives a transmission permission, in which a transmission time zone, that is, data transmission start time and data transmission time are allocated, to PON terminal apparatus ONU 103A and PON terminal apparatus ONU 103B using DBA module 104. As a result, PON station side apparatus OLT 101 registers the transmission-permitted transmission time zone, that is, the data transmission start time and the data transmission time, for each PON terminal apparatus ONU, with bandwidth allocation state table 121 as shown in FIG. 5 so as to maintain information about the transmission time zones allocated to PON terminal apparatus ONU 103A and PON terminal apparatus ONU 103B as transmission permission. FIG. 5 is a table configuration diagram showing an example of bandwidth allocation state table 121 which is arranged in PON station side apparatus OLT 101 according to the present invention and in which the transmission-permitted data transmission start time and data transmission time is registered for each PON terminal apparatus ONU.

As shown in FIG. 5, bandwidth allocation state table 121 is configured to include at least uplink line bandwidth-allocation order position 121*a*, logical link identification number LLID 121*b*, uplink bandwidth allocation start time 121*c* that indicates transmission-permitted data transmission start time, and uplink bandwidth allocation time 121*d* that indicates transmission-permitted data transmission time. In the example of bandwidth allocation state table 121 shown in FIG. 5, registration is made which, for example, a PON terminal apparatus ONU whose bandwidth-allocation order position 121*a* is "1", is such a type of terminal apparatus ONU that its logical link identification number LLID 121*b* is "1", that is, the logical link identification number LLID 120*a* in LLID allocation state table 120 shown in FIG. 4 is "1" and PON terminal apparatus ONU number 119*a* is "3", for which the uplink bandwidth allocation start time 121*c* is "10:00:00" and the uplink bandwidth allocation time 121*d* is "00 hour 10 minutes and 00 second".

PON station side apparatus OLT 101 periodically notifies data transmission start time and data transmission time to PON terminal apparatus ONU 103A and PON terminal apparatus ONU 103B which are connected to PON station side apparatus OLT 101 in a predetermined cycle. That is, PON station side apparatus OLT 101 notifies information registered as uplink bandwidth allocation start time 121*c* and uplink bandwidth allocation time 121*d* in bandwidth allocation state table 121 shown in FIG. 5 as a transmission permission signal. Receiving the transmission permission signal, PON terminal apparatus ONU 103A and PON terminal apparatus ONU 103B transmit data for the uplink line, that is, they transmit data in the uplink direction in accordance with the data transmission start time and data transmission time specified as the transmission-permitted bandwidth (transmission time zone) in the received transmission permission signal.

As described above, PON station side apparatus OLT 101 is capable of obtaining correspondence between a PON terminal apparatus ONU which is performing uplink-direction data transfer and the communication speed at that time, on the basis of ONU setting management information registration table 119 in which the communication speeds of PON terminal apparatuses ONUs are set an the basis of, LLID allocation state table 120 with which a logical link identification number LLID allocated to each PON terminal apparatus ONU is registered, and on the basis of uplink bandwidth allocation state table 121 with which data transmission start time and data transmission time specified for each PON terminal apparatus ONU as a transmission-permitted bandwidth are registered.

Thus, by controlling the operation of speed selector 105 shown in FIG. 2 to switch among selectors 118*a* to 118E, on the basis of the obtained communication speed information, PON station side apparatus OLT 101 can switch to a module corresponding to the communication speed of a PON terminal apparatus ONU which performs data transfer, among the modules (that is, the physical medium dependent section PMD module, the physical medium attachment section PMA module, the physical coding sublayer PCS module and the frame buffer module) to appropriately receive data transmitted from the PON terminal apparatus ONU.

Figure 6:
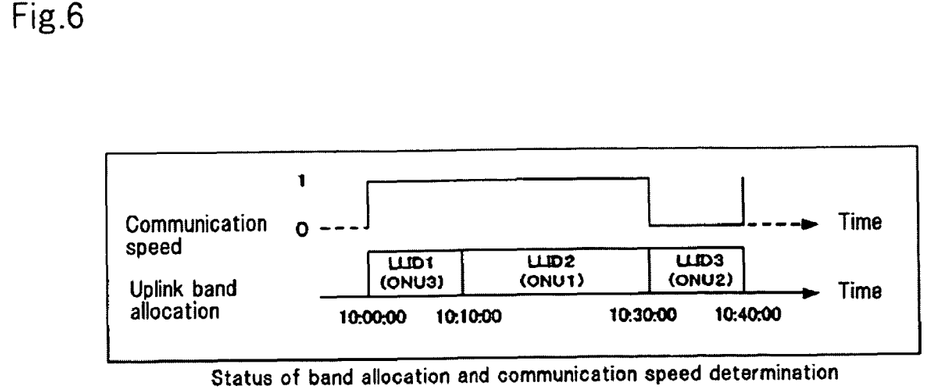
FIG. 6 is a conceptual diagram showing an example of the bandwidth allocation status and the communication speed determination status of the uplink line of the PON station side apparatus OLT according to the present invention.

FIG. 6 is a conceptual diagram showing an example of the bandwidth allocation status and the communication speed determination status of the uplink line of PON station side apparatus OLT 101 according to the present invention. The diagram specifically illustrates that the bandwidth allocation status and communication speed determination status of an uplink line are changed as time elapses, on the basis of the registration example set in ONU setting management information registration table 119 in FIG. 3, LLID allocation state table 120 in FIG. 4 and bandwidth allocation state table 121 in FIG. 5 as an example. As described before, in response to switching of bandwidth allocation for the uplink line as shown in FIG. 6, the operation of switching among selectors 118A to 118E is controlled from speed selector 105 inside PON station side apparatus OLT 101 in FIG. 2, and a module corresponding to the communication speed at which data from a PON terminal apparatus ONU should be received and transferred at each time is caused to be effective for allocating bandwidths. On the other hand, as for a module which does not correspond to the timing at which data from a PON terminal apparatus ONU should be received, an IDLE pattern indicating that there is no data is set. By using such a mechanism, it is possible to without fail transfer only data which is originally to be transferred.

Description of Advantages of the Exemplary Embodiment

In the case where multiple data with different communication speeds, like 1 Gbps and 10 Gbps, in the uplink line, are transmitted to PON station side apparatus OLT 101 using the same wavelength (λ3), it is necessary, in order to normally perform a data receiving operation according to each communication speed, for PON station side apparatus OLT 101 to be provided with two separate PMD modules to respond to differences in the communication speed, like 1 G PMD module 106 and 10 G PMD module 108, so that it can receives the data by each of the two PMD modules irrespective of whether there is data from the uplink line or not.

For example, when data of a 1 Gbps signal is being transmitted from PON terminal apparatus ONU 103A, 1 G PMD module 106 can normally receive the data. For 10 G PMD module 108, however, the data is such that originally should not be received. The same goes for the opposite case where data of a 10 Gbps signal is transmitted from PON terminal apparatus ONU 103B. The same goes for 1 G PMA/PCS module 110 and 10 G PMA/PCS module 112 arranged after 1 G PMD module 106 and 10 G PMD module 108, respectively, and for 1 G frame buffer module 114 and 10 G frame buffer module 115.

Originally, the light of the PON terminal apparatus ONU is extinguished when there is no data to be transmitted from a PON terminal apparatus ONU. Therefore, PON station side apparatus OLT 101 can determine whether or not data has been received in a PMD module. However, in the case where multiple data at different communication speeds, like 1 Gbps and 10 Gbps, are transmitted to the PON station side apparatus OLT 101 from the uplink line, and when the multiple data are time-division multiplexed, with the use of the same wavelength (λ3), PON station side apparatus OLT 101 cannot determine whether there is data or not by extinction of the light of one PON terminal apparatus ONU. As a result, even such data as originally should not be received is received as a noise.

On the other hand, each module inside PON station side apparatus OLT 101 determines whether the receiving state is normal or not on the basis of received data, and therefore, there is a possibility that the module erroneously determines that the receiving state is normal even in the case of data which originally should not be received, because of a noise.

In the exemplary embodiment, due to the switching operation of speed selector 105 interlocked with dynamic bandwidth allocation function DBA module 104, PON station side apparatus OLT 101 can certainly prevent such data as originally should not be received, from being erroneously received as normal received data, as described before. Furthermore, when 1 G PMD module 106 and 10 G PMD module 108 are not at the timing to receive data, PON station side apparatus OLT 101 outputs an IDLE pattern indicating that there is not data, instead of received data from a PON terminal apparatus ONU, by 1 G PMD IDLE PG module 107 and 10 G PMD IDLE PG module 109. When 1 G PMA/PCS module 110 and 10 G PMA/PCS module 112 are not at the timing to receive data, PON station side apparatus OLT 101 outputs an IDLE pattern indicating that instead of having received data from PON terminal apparatus ONU no data has been received, by the 1 G PMA/PCS IDLE PG module 111 and 10 G PMA/PCS IDLE PG module 113. Due to this operation, PON station side apparatus OLT 101 can certainly prevent such data as originally should not be received, from being received as normal received data.

As described above, in the exemplary embodiment, advantages as described below can be obtained.

A first advantage is that: a section corresponding to an uplink line in PON station side apparatus OLT 101 is provided with receiving circuits for receiving data from PON terminal apparatus ONU 103A and 103B, respectively, according to communication speeds, and is configured to obtain correspondence between the bandwidth allocated for an uplink line (data transmission time zone, that is, data transmission start time and data transmission time for PON terminal apparatus ONU 103A and 103B) and the communication speed to switch the receiving circuit, so that it is possible to normally perform data transfer corresponding to the communication speed even in uplink communication.

A second advantage is that: the operation of speed selector 105 is switched when interlocked with dynamic bandwidth allocation function DBA, and an IDLE pattern that indicates that there is no data is outputted instead of an indication from a PON terminal apparatus ONU that data has been received in the case where communication is not performed, so that it is possible to always prevent misjudgment about data receiving.

While preferred exemplary embodiments of the present invention have been described using specific terms, such description is for illustrative purposes only, and it is to be understood that changes and variations may be made without departing from the spirit or scope of the following claims.

What is claimed is:

1. A PON station side apparatus in a PON system which transfers multiple data at different communication speeds by time division multiplexing from PON terminal apparatuses to the PON station side apparatus, the PON station side apparatus comprising:
    multiple receiving circuits which receive the data at different communication speeds;
    a selection section which selects a receiving circuit that receives each set of the data from among the multiple receiving circuits on the basis of transmission time zones for the data; and
    a switching section which switches the receiving circuit selected by the selection section, from among the multiple receiving circuits, to be a receiving circuit, for destination at which the data is received,
    wherein each of the receiving circuits comprises:
        a PMD (physical medium dependent) which receives the data;
        a PMA (physical medium attachment) and a PCS (physical coding sublayer) which convert the data received by the PMD to Ethernet-frame-format data; and
        a frame buffer which buffers the data which has been converted by the PMA and the PCS.

2. The PON station side apparatus according to claim 1, further comprising an IDLE pattern setting section where in an IDLE pattern indicating that there is no data is set for the receiving circuit whose value is correspond to the value of the timing in the transmission time zone so as to be able to receive the data among the multiple receiving circuits.

3. The PON station side apparatus according to claim 1, further comprising a dynamic bandwidth allocation section which dynamically allocates transmission time zones for the PON terminal apparatuses and notifies each of the PON terminal apparatus of each of the allocated transmission time zones; wherein
    the selection section selects the receiving circuit that receives each of the data from among the multiple receiving circuits on the basis of the transmission time zones notified by the dynamic allocation section.

4. A PON uplink line communication method in a PON system which transfers multiple data at different communication speeds by time division multiplexing from PON terminal apparatuses to the PON station side apparatus, wherein:
    the PON station side apparatus selects a receiving circuit that receives the data, from among multiple receiving circuits provided according to communication speeds, on the basis of transmission time zones for the data;
    the selected receiving circuit among the multiple receiving circuits is switched to be a receiving circuit for a destination at which data is received, and the data is received through the switched receiving circuit;
    each of the communication circuits is provided with a PMD (physical medium dependent), a PMA (physical medium attachment) and a PCS (physical medium attachment), and a frame buffer;
    the PMD receives the data;
    the PMA and the PCS convert the data received by the PMD to Ethernet-frame-format data; and
    the frame buffer buffers the data which has been converted by the PMA and the PCS.

5. The PON uplink line communication method according to claim 4, wherein an IDLE pattern indicating that there is no data is set for the receiving circuit whose value is correspond to the value of the timing in the transmission time zone so as to be able to receive the data among the multiple receiving circuits.

6. The PON uplink line communication method according to claim 4, wherein
    the transmission time zones for the PON terminal apparatuses are dynamically allocated, and each of the allocated transmission time zones is notified to each of the PON terminal apparatuses; and
    the receiving circuit that receives the data is selected from among the multiple receiving circuits on the basis of the notified transmission time zones for the data.

7. A PON station side apparatus in a PON system which transfers multiple data at different communication speeds by time division multiplexing from PON terminal apparatuses to the PON station side apparatus, the PON station side apparatus comprising:
    means for selecting a receiving circuit that receives the data, from among multiple receiving circuits provided according to communication speeds, on the basis of transmission time zones for the data; and
    switching means for switching the receiving circuit selected by the selection means from among the multiple receiving circuits to be a receiving circuit for a destination at which data is received and receiving the data through the switched receiving circuit,
    wherein each of the receiving circuits comprises:
        a PMD (physical medium dependent) which receives the data;
        a PMA (physical medium attachment) and a PCS (physical coding sublayer) which convert the data received by the PMD to Ethernet-frame-format data; and
        a frame buffer which buffers the data which has been converted by the PMA and the PCS.

* * * * *